Feb. 10, 1959   W. J. DONALDSON, ET AL   2,873,411
VIBRATION-ATTENUATING SEALING STRUCTURE
Filed Sept. 21, 1955

Inventors:
Warren J. Donaldson,
James C. Jacobs, Jr.
by J. Wesley Lauber
Their Attorney.

2,873,411
Patented Feb. 10, 1959

2,873,411
VIBRATION-ATTENUATING SEALING STRUCTURE

Warren J. Donaldson, Upper Darby, and James C. Jacobs, Jr., Newtown Square, Pa., assignors to General Electric Company, a corporation of New York Application September 21, 1955, Serial No. 535,720

7 Claims. (Cl. 317—99)

This invention relates to sealing structure which serves both as a weatherproof enclosure and as an effective means for preventing the transmission of vibrations and noises.

The invention is particularly applicable to transition compartments such as are used in unit substations for interconnecting power transformers and associated switchgear. Such compartments enclose the electric conductors which extend between the transformer and the switchgear and are intended primarily to exclude moisture and other foreign matter from the conductors and associated apparatus.

If the vibrations and noises produced by operation of the transformer are permitted to be transmitted through this compartment to the switchgear unit, then the sheet metal casing of the switchgear unit will act as a sounding board which amplifies the vibrations and contributes undesirably to the overall noise level. Prior efforts to incorporate vibration suppressors in such compartments have resulted in unduly impairing the sealing ability of the compartment.

Accordingly, it is an object of our invention to provide structure which is capable not only of effectively impeding the transmission of noises and vibrations but also of providing a weatherproof seal for excluding moisture and foreign matter.

In accordance with one form of our invention, we construct the vibration-attenuating sealing structure from a pair of axially-spaced frameworks having generally aligned openings defining a passageway extending axially therethrough. One of the frameworks comprises spaced-apart axially-projecting flanges defining a groove surrounding the passageway, whereas the other framework comprises an axially-projecting tongue surrounding the passageway and extending into the groove. A resilient insert is attached to the tongue and has opposed peripheral portions extending into sealing relationship with the flanges. The insert is so shaped in cross-section that its axial thickness in the region adjacent the flanges is substantially less than its axial thickness adjacent the tongue.

Figure 1:
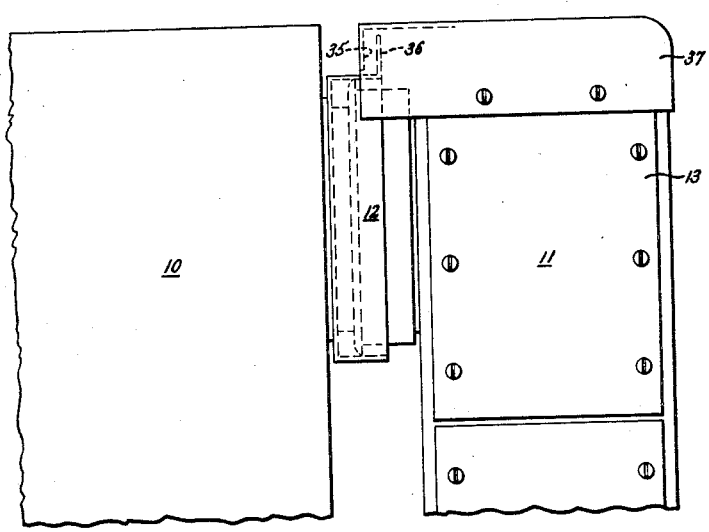
Figure 2:
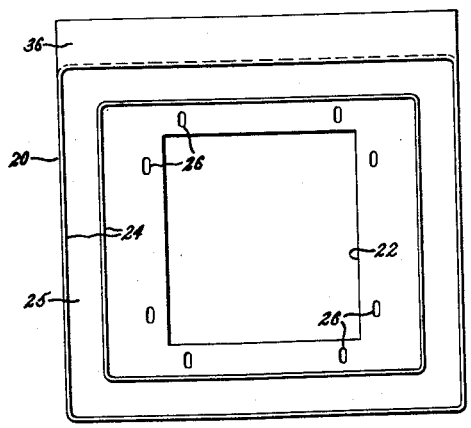
Figure 3:
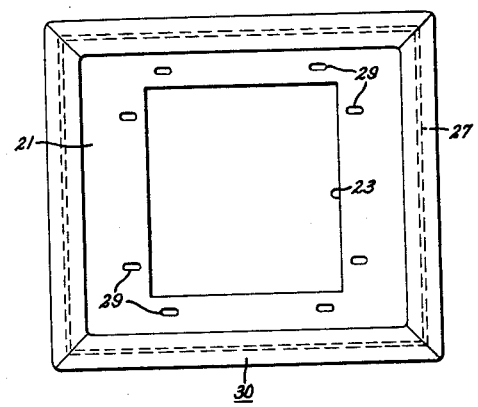
Figure 4:
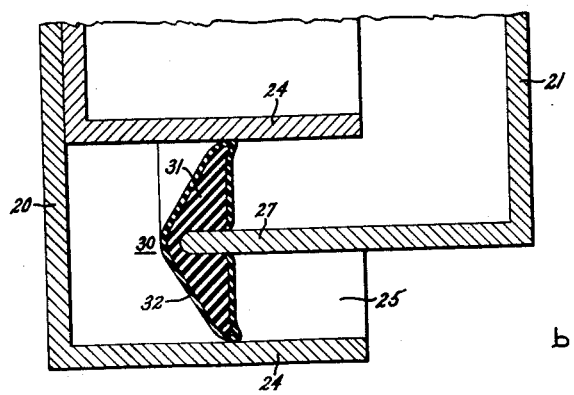

For a better understanding of our invention reference may be had to the following specification taken in connection with the accompanying drawing wherein: Fig. 1 is a side elevational view of a portion of a unit substation comprising a transition compartment constructed in accordance with our invention; Figs. 2 and 3 are end views respectively showing the two frame works which, when assembled together, form the transition compartment; whereas Fig. 4 is a cross-sectional view showing a portion of the frameworks of Figs. 2 and 3 in assembled relationship.

Referring now to the drawing, Fig. 1 shows a portion of an outdoor unit substation comprising a transformer 10, switchgear apparatus 11 and a transition compartment 12 extending therebetween. The transformer 10 is electrically connected to the switchgear apparatus 11 by suitable conductors (not shown) extending through the transition compartment 12. As will soon appear more clearly, the transition compartment 12 serves to exclude moisture, dust, and other foreign matter from the conductors and from the associated apparatus so as to preserve the associated insulation.

The transition compartment also serves as a means for impeding the transmission of noises and vibrations from the transformer 10 to the sheet metal enclosure 13 of the switchgear apparatus, thus maintaining the overall noise level of the substation within acceptable limits. The specific structural details of the transition compartment which enable it to effectively perform the above two functions will now be described.

Referring to Figs. 2 and 3, there is shown a pair of frameworks 20 and 21 which, when assembled together, constitute the axially extending walls of the compartment. The two frameworks contain central openings 22 and 23 which generally align and define a passageway through which the electric conductors extend. The first framework 20 is provided with a pair of spaced-apart axially-projecting flanges 24 which form a groove 25 extending in a rectangular path about the opening 22. The framework 20 is secured to the casing of transformer 10 by means of suitable bolts extending through slots 26 formed in the framework. These slots 26 are vertically elongated to permit vertical adjustment of the frame with respect to the transformer casing.

The other framework 21 comprises an axially-projecting peripheral tongue 27 which extends along a rectangular path corresponding to that of groove 25. This other framework 21 is secured to the casing 13 of the switchgear apparatus by means of suitable bolts extending through slots 29 formed in the framework 21. These slots are horizontally elongated to permit limited horizontal adjustment of the framework 21 with respect to casing 13.

As shown in Fig. 4, the tongue 27 fits within the groove 25 and carries at its innermost end a resilient insert 30 constructed in accordance with the present invention. This resilient insert, which extends about the entire rectangular path of the groove, comprises a relatively soft core portion 31, preferably of sponge rubber, and an outer covering 32 of a much harder rubber-like material, such as neoprene. The insert is preferably cemented to the tongue 27, and along its inner and outer peripheral edges bears in abutting relationship against the inner surfaces of the flanges 24.

In accordance with our invention the cross sectional configuration of the insert, as seen in Fig. 4, is such that the insert tapers from a region of maximum axial thickness adjacent the tongue 27 to regions of minimum axial thickness adjacent the inner and outer peripheries of the insert. This is highly advantageous in that the insert 30 contacts the flanges 24 along only a minor portion of its overall axial thickness, thereby presenting only a very restricted surface area through which vibrations can be transmitted from the flanges 24. Also because the peripheral portions are highly resilient due to their limited axial thickness, they present a very high impedance to the transmission of noises and vibrations. The thickened resilient center region of the insert insures that the peripheral regions will be urged into sealing relationship with the flanges with sufficient force to provide an effective seal.

The relatively hard resilient covering 32 serves not only to form the seal at peripheral regions of the insert but also as a weatherproof barrier which protects the soft core 31 from the effects of moisture and other foreign matter which may be detrimental thereto.

To insure that the resilient insert 30 is not excessively compressed between the tongue 27 and one of the flanges 24 (which would materially decrease its impedance to the transmission of vibrations), we provide for adjustment of the framework 21 in such a manner that the tongue can be centered in the rectangularly-extending groove 25 on all four of its sides. More particularly, the slots 26 in the framework 20, since they extend vertically, permit this framework to be properly positioned vertically so that the tongue is centered in the groove at the upper and lower sides of the framework, whereas the slots 29, since they extend horizontally, permit the framework 21 to be properly positioned horizontally so that the tongue is centered in the groove at the vertically extending sides. Either of these adjustments, vertical or horizontal, may be carried out without affecting the other adjustment. Thus, it will be apparent that these mutually perpendicular sets of slots 26 and 29 provide a structurally simple, effective means for assuring proper compression of the resilient insert 30.

Another feature of our transition compartment is that even if, for any reason, moisture should be forced past one edge of the insert 30, it would then be forced to follow a long and tortuous path around the outer periphery of the groove before it could enter the enclosed apparatus. Also this path would be effectively blocked by the seal provided by the other edge of the insert. These additional features coacting in this manner further contribute to the effectiveness of our sealing structure.

Still another feature which contributes to the effectiveness of our sealing structure is the fact that a pair of spaced apart labyrinth-forming flanges 35 and 36 are provided at the top of the transition compartment, as shown in Fig. 1. The flange 36 is formed as a projecting portion of framework 20 and extends perpendicular to the groove-forming flanges 24. The other flange 35 overlaps the flange 36 and constitutes part of a hood 37 which extends axially over the major portion of the compartment 12. These labyrinth-forming flanges 35 and 36 further increase the length and tortuousness of the path required for entry into the compartment 12 and, thus, further minimize the possibility for entry of any foreign matter.

While we have shown and described a particular embodiment of our invention, it will be obvious to those skilled in the art that various changes and modifications may be made without departing from our invention in its broader aspects, and we, therefore, intend in the appended claims to cover all such changes and modifications as fall within the true spirit and scope of our invention.

What we claim as new and desire to secure by Letters Patents of the United States is:

1. Vibration-attenuating sealing structure comprising a pair of axially-spaced frameworks having generally aligned openings defining a passageway extending axially therethrough, a first one of said frameworks comprising spaced-apart axially-projecting flanges defining a groove surrounding said passageway, the other of said frameworks comprising an axially-projecting tongue surrounding said passageway and extending into said groove, a resilient insert attached to said tongue and having opposed peripheral portions at least one of which extends into sealing relationship with one of said flanges, said insert while positioned between said tongue and flanges having an axial thickness in the region adjacent said flanges amounting to only a minor portion of the overall axial thickness of the insert and substantially less than its axial thickness in the region adjacent said tongue.

2. In a unit substation comprising a transformer, an adjacent switchgear unit, and conductive means extending therebetween, a compartment enclosing said conductive means and comprising a pair of axially-spaced frameworks connected respectively to said transformer and said switchgear unit, a first one of said frameworks comprising spaced-apart axially-projecting flanges defining a groove surrounding said conductive means, the other of said frameworks comprising an axially-projecting tongue surrounding said conductive means and extending into said groove, a resilient insert attached to said tongue and having opposed peripheral portions at least one of which extends into sealing relationship with one of said flanges, said insert while positioned between said tongue and flanges having an axial thickness in the region adjacent said flanges amounting to only a minor portion of the overall axial thickness of the insert and substantially less than its axial thickness in the region adjacent said tongue.

3. Vibration-attenuating sealing structure comprising a pair of axially-spaced frameworks having generally aligned openings defining a passageway extending axially therethrough, a first one of said frameworks comprising spaced apart axially-projecting flanges defining a groove surrounding said passageway, the other of said frameworks comprising an axially-projecting tongue surrounding said passageway and extending into said groove, a resilient insert bonded to said tongue and having opposed peripheral portions extending into sealing relationship with said flanges, the cross-sectional configuration of said insert being such that it tapers from a relatively large axial thickness adjacent said tongue to a relatively small axial thickness adjacent said flanges, the axial thickness of said insert adjacent said flanges amounting to only a minor portion of the overall axial thickness of said insert when the insert is positioned between said tongue and said flanges.

4. The sealing structure of claim 3 in combination with a hood overlying said sealing structure and provided with a first flange extending transversely with respect to said axially-projecting flanges, an additional flange projecting from said sealing structure transversely to said axially-projecting flanges and overlapping said first flange in spaced-apart relationship to form therewith a labyrinth like structure which further restricts entry into said passageway.

5. Vibration-attenuating sealing structure comprising a pair of axially-spaced frameworks having generally aligned openings defining a passageway extending axially therethrough, a first one of said frameworks comprising spaced-apart axially-projecting flanges defining a groove surrounding said passageway, the other of said frameworks comprising an axially-projecting tongue surrounding said passageway and extending into said groove, a resilient insert attached to said tongue and comprising a relatively soft, spongy core portion and a weatherproof cover of a substantially harder resilient material, said cover extending into sealing relationship with at least one of said flanges, the cross-sectional configuration of said insert being such that it tapers from a relatively large axial thickness adjacent said tongue to a relatively small axial thickness adjacent said flanges, the axial thickness of said insert adjacent said flanges amounting to only a minor portion of the overall axial thickness of said insert when said insert is positioned between said tongue and said flanges.

6. Vibration-attenuating sealing structure comprising a pair of axially-spaced frameworks having generally aligned openings defining a passageway extending axially therethrough, a first one of said frameworks comprising spaced-apart axially projecting flanges defining a groove extending rectangularly about said passageway, the other of said frameworks comprising a four-sided axially-projecting tongue extending rectangularly about said passageway and projecting into said groove, a resilient insert attached to said tongue and having opposed peripheral portions at least one of which extends into sealing relationship with one of said flanges, the axial thickness of said insert in the region adjacent said flanges being substantially less than its axial thickness in the region adjacent said tongue, and means for mounting said frameworks on adjacent structure comprising a set of bolt-receiving slots for each of said frameworks, the slots for one of said frameworks extending parallel to one set of parallel sides of the tongue and in a direction mutually perpendicular to the slots for the other said frameworks whereby to permit said frameworks to be positioned to assure the desired compression of said resilient insert along all four sides of said rectangularly extending groove.

7. Vibration-attenuating sealing structure comprising a pair of axially-spaced frameworks, one of said frameworks having spaced-apart axially-projecting flanges defining a groove which extends in a closed path about a portion of said one framework, the other of said frameworks having a tongue portion which projects axially into said groove and generally follows the same closed path as said groove, a resilient insert attached to said tongue portion and having opposed peripheral portions at least one of which extends into sealing relationship with one of said flanges, the axial thickness of said insert in the region adjacent said flanges being substantially less than its axial thickness in the region adjacent said tongue portion, the axial thickness of said insert adjacent said flanges amounting to only minor portion of the overall thickness of said insert when the insert is positioned between said tongue and said flanges.

References Cited in the file of this patent

UNITED STATES PATENTS

| | | |
|---|---|---|
| 727,842 | Robb | May 12, 1903 |
| 1,136,929 | Bonnell | Apr. 27, 1915 |
| 2,167,419 | Heanes | July 25, 1939 |
| 2,362,304 | Reed | Nov. 7, 1944 |
| 2,468,885 | Lubbock | May 3, 1949 |
| 2,550,493 | Ohlson | Apr. 24, 1951 |
| 2,606,232 | St. John | Aug. 5, 1952 |
| 2,642,483 | Wey | June 16, 1953 |
| 2,693,009 | Beck | Nov. 2, 1954 |
| 2,705,211 | De Wyk | Mar. 29, 1955 |
| 2,784,012 | Killian | Mar. 5, 1957 |